United States Patent [19]

Nagano et al.

[11] Patent Number: 4,659,785

[45] Date of Patent: * Apr. 21, 1987

[54] HOT-MELT ADHESIVE COMPOSITION

[75] Inventors: Riichiro Nagano, Hiroshima; Toshihiro Sagane, Yamaguchi, both of Japan

[73] Assignee: Mitsui Petrochemical Industries, Ltd., Tokyo, Japan

[ * ] Notice: The portion of the term of this patent subsequent to Dec. 25, 2001 has been disclaimed.

[21] Appl. No.: 764,977

[22] Filed: Aug. 13, 1985

Related U.S. Application Data

[63] Continuation of Ser. No. 514,785, Jul. 18, 1983, abandoned.

[30] Foreign Application Priority Data

Jul. 16, 1982 [JP] Japan ............................. 57-123018
Aug. 5, 1982 [JP] Japan ............................. 57-135718

[51] Int. Cl.$^4$ ............................................ C08F 255/04
[52] U.S. Cl. .................................. 525/324; 525/319; 525/322; 428/516

[58] Field of Search .............. 525/324, 322, 319, 320, 525/316

[56] References Cited

U.S. PATENT DOCUMENTS

| | | | |
|---|---|---|---|
| 3,478,129 | 11/1969 | Kern | 525/324 |
| 4,126,648 | 11/1978 | Agouri | 525/324 |
| 4,483,965 | 11/1984 | Ohba | 525/324 |
| 4,490,508 | 12/1984 | Nagano | 525/324 |

Primary Examiner—Paul R. Michl
Attorney, Agent, or Firm—Sherman & Shalloway

[57] ABSTRACT

A hot-melt adhesive composition comprising a styrene-type hydrocarbon-modified polyolefin (c) composed of 100 parts by weight of a crystalline polyolefin (a) having a degree of crystallinity of at least 10% and 0.15 to 50 parts by weight of a styrene-type hydrocarbon (b) bound thereto by great-copolymerization, said modified polyolefin (c) having an intrinsic viscosity [η] of 0.5 to 5 dl/g, a degree of crystallinity of at least 10% and a weight average molecular weight $\overline{M}w$/number average molecular weight $\overline{M}n$ ratio of from 1 to 15; and use of the aforesaid composition as an intermediate adhesive layer in laminating two polymers.

13 Claims, No Drawings

HOT-MELT ADHESIVE COMPOSITION

This application is a continuation of application Ser. No. 514,785, filed July 18, 1983, now abandoned.

This invention relates to a novel hot-melt adhesive composition. More specifically, this invention relates to a hot-melt adhesive composition based on a certain kind of styrene-type hydrocarbon-modified polyolefin which exhibits excellent bonding performance when an aromatic polymer is laminated to a polyolefin, and to its use in laminating an aromatic polymer to a polyolefin.

Aromatic polymers such as polystyrene, polyethylene terephthalate, polycarbonate and polyphenylene oxide have been used extensively as food containers, packaging materials, sundries, automotive interior finishing materials, and materials for industrial machinery. In applications which require chemical resistance, water resistance, oil resistance, hot water resistance, heat resistance, heat-sealability and gas-barrier property, particularly in foodstuff applications, attempts have been made to laminate a polyolefin such as polyethylene or polypropylene to the aromatic polymer in order to impart and/or improve these properties. Adhesives having excellent bonding performance have not been developed, and no laminate has been obtained which has excellent adhesive property. For example, when an alpha,beta-unsaturated carboxylic acid-grafted polyolefin or an epoxy group-containing polyolefin, known as an ordinary adhesive polyolefin, is used as an adhesive for laminating a polyolefin to a styrene-type polymer, no excellent bonding property can be obtained. Likewise, no excellent bonding property can be obtained when such a modified polyolefin is directly laminated onto a styrene-type polymer.

With the foregoing background, the present inventors have made extensive investigations in order to develop an adhesive having good adhesive properties which serves as an intermediate adhesive layer in the lamination of an aromatic polymer to a polyolefin, and consequently found that a modified polyolefin with specified properties having a styrene-type hydrocarbon graft-copolymerized therewith meets the above purpose.

According to this invention, there is provided a hot-melt adhesive composition comprising a styrene-type hydrocarbon-modified polyolefin (c) composed of 100 parts by weight of a crystalline polyolefin (a) having a degree of crystallinity of at least 10% and 0.15 to 50 parts by weight of a styrene-type hydrocarbon (b) bound thereto by graft-copolymerization, said modified polyolefin (c) having an intrinsic viscosity [$\eta$] of 0.5 to 5 dl/g, a degree of crystallinity of at least 10% and a weight average molecular weight $\overline{M}w$/number average molecular weight $\overline{M}n$ ratio of from 1 to 15.

The hot-melt adhesive composition provided by this invention has excellent adhesiveness both to polyolefins and aromatic polymers, and serves greatly to supply polyolefin-aromatic polymer laminates having excellent chemical resistance, water resistance, hot water resistance, oil resistance, gas-barrier property, etc.

The hot-melt adhesive composition of this invention is based on a modified polyolefin obtained by graft-copolymerizing a specified polyolefin with a styrene-type hydrocarbon. The base polyolefin (a) constituting the styrene-type hydrocarbon-grafted modified polyolefin should have a degree of crystallinity of at least 10%, preferably at least 15%, especially preferably 20 to 70%. A polyolefin having a degree of crystallinity of less than 10% tends to give an adhesive composition having low heat resistance.

The "degree of crystallinity", as used in the present specification and the appended claims, denotes one measured by an X-ray diffraction method at 23° C.

Advantageously, the base polyolefin (a) further has an intrinsic viscosity [$\eta$], measured at 135° C. in decalin, of usually 0.5 to 5 dl/g, preferably 0.7 to 4 dl/g, more preferably 0.75 to 3 dl/g, and a density of usually 0.83 to 0.98 g/cm$^3$, preferably 0.83 to 0.97 g/cm$^3$, more preferably 0.84 to 0.96 g/cm$^3$.

The base polyolefin (a) should desirably have as narrow a molecular weight distribution as possible. Very desirably, its molecular weight distribution expressed in terms of the ratio of its weight average molecular weight $\overline{M}w$ to its number average molecular weight $\overline{M}n$ is generally 1 to 15, preferably 1 to 10, more preferably 1 to 8. By using a polyolefin having such a narrow molecular weight distribution, the adhesive strength of the resulting hot-melt adhesive composition can be increased.

The molecular weight distribution expressed by the ratio of the weight average molecular weight $\overline{M}w$/ the number average molecular weight $\overline{M}n$ is measured by gel permeation chromatography (GPC) by the following method. To 100 parts by weight of o-dichlorobenzene as a solvent, 0.04 g (containing 0.05 g, per 100 parts by weight of the polymer, of 2,6-di-tert-butyl-p-cresol as a stabilizer) to form a solution. The solution was passed through a one-micron filter to remove insoluble materials such as dirt and dust. Then, the measurement was made by using a GPC measuring device set at a column temperature of 135° C. and a flow rate of 1.0 ml/min. The numerical ratio was converted on the basis of polystyrene.

Examples of the polyolefin (a) used as a base material having the aforesaid properties include homopolymers of linear or branched alpha-olefins having 2 to 20 carbon atoms, preferably 2 to 12 carbon atoms, such as ethylene, propylene, 1-butene, 1-pentene, 1-hexene, 4-methyl-1-pentene, 3-methyl-1-pentene, 1-octene and 1-decene; copolymers of at least two of these alpha-olefins; and copolymers of at least 85 mole%, preferably at least 90 mole%, of these alpha-olefins with at most 15 mole %, preferably at most 10 mole%, of other vinyl comonomers such as vinyl acetate, acrylic acid, methacrylic acid, acrylic esters, methacrylic esters, metal acrylates, metal methacrylates, and maleic anhydride. The polyolefin (a) may contain a diene component in an amount small enough not to substantially affect the aforesaid properties of the polyolefin (preferably at most 0.5 mole% based on the polymer).

Examples of polyolefins which can be especially advantageously used as the base polyolefin (a) in this invention are ethylene-type polymers including polyethylene, ethylene/alpha-olefin copolymers (with an ethylene content of at least 75 mole%) such as an ethylene/propylene copolymer, an ethylene/butene-1 copolymer, an ethylene/4-methyl-1-pentene copolymer, an ethylene/hexene-1 copolymer, an ethylene/octene-1 copolymer, and an ethylene/decene-1 copolymer, and ethylene/vinyl monomer copolymers (the total vinyl monomer content being not more than 15 mole %) such as an ethylene/vinyl acetate copolymer, an ethylene/ethyl acrylate copolymer, an ethylene/acrylic acid copolymer, a partially neutralized salt of an ethylene/acrylic acid copolymer, an ethylene/methacrylic acid copolymer, a partially neutralized salt of an ethylene/methacrylic acid copolymer, an ethyl acrylate/butyl acrylate copolymer, a partially neutralized salt of an ethyl acrylate/butyl acrylate copolymer, an ethylene/methacrylate acid/butyl methacrylate copolymer, a partially neutralized salt of an ethylene/methacrylic acid/butyl methacrylate copolymer, an ethylene/maleic anhydride/ethyl acrylate copolymer, and an ethylene/maleic anhydride/butyl acrylate copolymer.

Commercially available ethylene/vinyl monomer copolymers obtained by high-pressure radical polymerization generally have a molecular weight distribution, $\overline{M}w/\overline{M}n$, of as high as at least 15, and are not suitable for the present invention.

Other useful polyolefins include polypropylene, propylene/alpha-olefin copolymers (with a propylene content of at least 60 mole %) such as a propylene/ethylene copolymer, a propylene/butene-1 copolymer, a propylene/hexene-1 copolymer and a propylene/4-methyl-1-pentene copolymer, polybutene-1, butene-1/alpha-olefin copolymers (with a butene-1 content of at least 80 mole %) such as butene-1/ethylene copolymer, a butene-1/propylene copolymer, a butene-1/4-methyl-1-pentene copolymer and a butene-1/hexene-1 copolymer, poly-4-methyl-1-pentene, and 4-methyl-1-pentene/alpha-olefin copolymers (with a 4-methyl-1-pentene content of at least 80 mole %) such as a 4-methyl-1-pentene/ethylene copolymer, a 4-methyl-1-pentene/propylene copolymer, a 4-methyl-1-pentene/decene-1 copolymer, a 4-methyl-1-pentene/octadecene copolymer and a 4-methyl-1-pentene/3-methyl-1-pentene copolymer.

Also useful as the base polyolefin used in this invention are grafted products of the aforesaid alpha-olefin copolymers or ethylene/vinyl monomer copolymers and at least one unsaturated carboxylic acid (the grafted polymers contain not more than 3 mole %, preferably not more than 1 mole %, more preferably not more than 0.5 mole %, of the unsaturated carboxylic acid). The unsaturated carboxylic acid is selected from the group consisting of unsaturated monocarboxylic acids such as acrylic acid and methacrylic acid, unsaturated dicarboxylic acids such as maleic acid, fumaric acid, itaconic acid, citraconic acid, allylsuccinic acid, mesaconic acid, glutaconic acid, Nadic acid, methyl Nadic acid, tetrahydrophthalic acid and methylhexahydrophthalic acid, and unsaturated dicarboxylic acid anhydrides such as maleic anhydride, itaconic anhydride, citraconic anhydride, allylsuccinic anhydride, glutaconic anhydride, Nadic anhydride, methylNadic anhydride, tetrahydrophthalic anhydride and methyltetrahydrophthalic anhydride. These polymers are especially useful when in the production of a laminated article, a polymer having barrier properties, such as a polyamide or an ethylene/vinyl alcohol copolymer, is used as one layer.

The "styrene-type hydrocarbon (b)" to be grafted to the base polyolefin (a) described above is styrene or a styrene derivative having 1 to 3, preferably 1 to 2, especially preferably only one, lower alkyl substituent at the vinyl group portion and/or the benzene ring portion of styrene. Typical examples are compounds represented by the following general formula

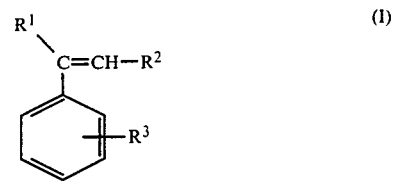

wherein $R^1$, $R^2$ and $R^3$, independently from each other, represent a hydrogen atom or a lower alkyl group.

The term "lower" as used herein means that a group or a compound qualified by this term has not more than 4, preferably not more than 3, carbon atoms. Thus, the "lower alkyl group" may be linear or branched, and include, for example, methyl, ethyl, n-propyl, isopropyl, n-butyl, isobutyl and t-butyl.

Desirably, in formula (I), at least one of $R^1$, $R^2$ and $R^3$ is a hydrogen atom, and the remainder are lower alkyl groups. Specific examples of the compounds of formula (I) include alpha-methylstyrene, beta-methylstyrene, o-methylstyrene, m-methylstyrene, p-methylstyrene, m-ethylstyrene, p-ethylstyrene, o-isopropylstyrene, m-isopropylstyrene and p-isopropylstyrene. Of these styrene-type hydrocarbons (b), styrene, m-methylstyrene and p-methylstyrene are particularly preferred.

The amount of the styrene-type hydrocarbon (b) bound to the base polyolefin (a) is 0.15 to 50 parts by weight, preferably 0.2 to 20 parts by weight, more preferably 0.2 to 5 parts by weight, per 100 parts by weight of the base polyolefin (a).

The graft-copolymerization of the styrene-type hydrocarbon (b) onto the base polyolefin (a) can be performed by methods known per se. For example, the styrene-type hydrocarbon (b) is graft-copolymerized with the base polyolefin (a) in the heat-melted state without a solvent, or the graft-copolymerization may be carried out in solution or dispersion. The former is preferred because it can give a styrene-type hydrocarbon-modified polyolefin (c) having a lower proportion of a homopolymer of the styrene-type hydrocarbon formed and/or a larger number of grafting sites on the polyolefin main chain.

As required, the above graft copolymerization may be carried out in the presence of a radical initiator. Examples of the radical initiators include organic peroxides and organic peresters, such as benzoyl peroxide, dichlorobenzoyl peroxide, dicumyl peroxide, di-tert-butyl peroxide, 2,5-dimethyl-2,5-di(peroxybenzoate)-hexyne-3, 1,4-bis(tert-butylperoxisopropyl)benzene, lauroyl peroxide, tert-butyl peracetate, 2,5-dimethyl-2,5-di(tert-butylperoxy)-hexyne-3, 2,5-di(tert-butylperoxy)hexane, tert-butyl perbenzoate, tert-butyl perphenylacetate, tert-butyl perisobutyrate, tert-butylper-sec-octoate, tert-butyl perpivalate, cumyl perpivalate and tert-butyl perdiethylacetate; and azo compounds such as azobisisobutyronitrile and dimethyl azoisobutyrate. Preferred among these are dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane, and 1,4-bis(tert-butylperoxyisopropyl)benzene.

The amount of the radical initiator used is not critical. In the case of graft-copolymerization in the molten state, the suitable amount of the radical initiator is 0.01 to 5 parts by weight per 100 parts by weight of the base polyolefin (a), and in the case of graft-copolymerization in solution, it is 0.01 to 100 parts by weight.

The temperature used in the graft-copolymerization varies depending upon the method of graft-copolymerization employed. Generally, in the case of graft-copolymerization in the molten state, temperatures at which the base polyolefin and the styrene-type hydrocarbon are melted, usually about 150° to about 350° C., preferably about 180° to about 320° C., are used. In the case of graft-copolymerization in solution, the suitable temperature is generally about 80° to about 200° C., preferably 100° to 180° C.

In the graft-copolymerization, the styrene-type hydrocarbon (b) is used in an amount of 0.15 to 100 parts by weight per 100 parts by weight of the base polyolefin (a). The preferred amount is 0.20 to 80 parts by weight, particularly 0.25 to 60 parts by weight.

In the heat-molten state, the graft copolymerization can be achieved by feeding the polyolefin (a), the styrene-type hydrocarbon and the radical initiator into an extruder, and maintaining the mixture at the above-specified temperature range for about 0.5 to about 10 minutes.

Ideally, all the styrene-type hydrocarbon charged should be grafted to the base polyolefin in the graft-copolymerization. The modified polyolefin (c) used in this invention may contain some amount of a homopolymer of the styrene-type hydrocarbon as a by-product. As the content of the homopolymer of the styrene-type hydrocarbon increases, the bonding performance of the resulting modified polyolefin (a) is reduced. Desirably, therefore, the content of such a homopolymer is limited to not more than 200 mole %, preferably not more than 180 mole%, more preferably not more than 150 mole%, based on the amount of the styrene-type hydrocarbon bonded to the polyolefin by graft-copolymerization. The amount of the styrene-type hydrocarbon bonded to the base polyolefin (a) by graft-copolymerization is calculated from the absorption intensity ratio of an aromatic proton and an aliphatic proton based on TMS in H—NMR.

The styrene-type hydrocarbon-modified polyolefin (c) produced as above should have an intrinsic viscosity [η], measured as stated hereinabove at 135° C. in decalin, of 0.5 to 5 dl/g, preferably 0.6 to 4 dl/g, more preferably 0.7 to 3 dl/g. The modified polyolefin (c) should have a degree of crystallinity of at least 10%, advantageously at least 15%, more advantageously 20 to 70%.

Desirably, the modified polyolefin (c) has a a narrow molecular weight distribution corresponding to the base polyolefin used. Conveniently, the $\overline{Mw}/\overline{Mn}$ ratio of the modified polyolefin (c) should be from 1 to 15, preferably from 1 to 12, more preferably from 1 to 10.

Advantageously, the modified polyolefin (c) has a density of generally 0.83 to 0.98 g/cm$^3$, preferably 0.83 to 0.97 g/cm$^3$, more preferably 0.84 to 0.96 g/cm$^3$. In order for the modified polyolefin (c) to be advantageously used as a hot-melt adhesive, it desirably has a melt viscosity at 230° C. of generally 10 to $5\times10^6$ poises, preferably 50 to $8\times10^5$ poises, more preferably 100 to $5\times10^5$ poises.

The hot-melt adhesive composition provided by this invention may be composed substantially only of the styrene-type hydrocarbon-grafted polyolefin (c). If desired, the adhesive composition may further include various additives such as antioxidants, ultraviolet absorbers, antistatic agents, pigments, dyes, nucleating agents, fillers, slip agents, lubricants, fire retardants, and antiblocking agents.

Examples of the antioxidants are 2,6-di-t-butyl-p-cresol, o-t-butyl-p-cresol, tetrakis-[methylene-3-(3,5-di-t-butyl-4-hydroxyphenyl)propionate]methane, beta-naphthylamine and p-phenylenediamine.

Examples of the ultraviolet absorbers are 2,4-dihydroxybenzophenone, 2-(2'-hydroxy-3',5'-di-t-butylphenyl)-5-chlorobenzotriazole, 2-(2-hydroxy-3-t-butyl-5-methylphenyl)-5-chlorobenzotriazole and bis(2,2',6,-6')-tetramethyl-4-piperidine)sebacate.

Examples of the antistatic agents are lauryl diethanolamine, palmityl diethanolamine, stearyl diethanolamine, oleyl diethanolamine, behenyl diethanolamine, polyoxyethylene alkylamines, stearyl monoglyceride, and 2-hydroxy-4-n-octoxybenzophenone.

Examples of colorants including pigments and dyes are carbon black, titanium white, cadmium yellow and copper phthalocyanine blue.

Examples of the nucleating agents are aluminum p-tert-butylbenzoate, dibenzylidene sorbitol and aluminum hydroxy-di-p-t-butylbenzoate.

Examples of the fillers are glass fibers, carbon fibers, talc, clay, silica, calcium carbonate, barium sulfate, magnesium hydroxide, calcium hydroxide and calcium.

Examples of the slip agents are stearamide, oleamide and erucamide.

Examples of the lubricants are calcium stearate, zinc stearate, aluminum stearate, magnesium stearate, and polyethylene wax.

Examples of the fire retardants are antimony oxide, decabromobiphenyl ether, and bis(3,5-dibromo-4-bromopropyloxyphenyl)sulfone.

An example of the antiblocking agents is silicon dioxide.

The amounts of these additives may be selected from suitable amounts which do not adversely affect the objects of this invention. For example, based on the total weight of the resins (a) and (b), the suitable amounts are about 0.01 to about 5% by weight for the antioxidants; about 0.01 to about 5% by weight for the ultraviolet absorbers; about 0.01 to about 1% by weight for the antistatic agents; about 0.01 to about 5% by weight for the coloring agents; about 0.01 to about 5% by weight for the nucleating agents; about 0.1 to about 60% by weight for the fillers; about 0.01 to about 1% by weight for the slip agents; about 0.01 to about 1% by weight for the lubricants; about 0.1 to about 50% by weight for the fire retardants; and about 0.01 to about 30% by weight for the antiblocking agents.

The hot-melt adhesive composition provided by this invention has excellent adhesion to polyolefins, aromatic polymers and chlorine-containing polymers.

According to another aspect of this invention, there is provided a laminated article composed of at least three layers, i.e.

(A) a first layer of a polymer selected from the group consisting of polyolefins, aromatic polymers and chlorine-containing polymers, (B) an intermediate adhesive layer composed of the hot-melt adhesive composition of this invention, and (C) a second layer of a polymer selected from the group consisting of aromatic polymers and chlorine-containing polymers.

The "aromatic polymers", as used herein, denote polymers obtained from vinyl-type monomers having an aromatic ring as at least one component by such polymerization reactions as radical polymerization, anionic polymerization, cationic polymerization or Ziegler-type polymerization, and polymers obtained from compounds having an aromatic ring as at least one component by polycondensation or addition condensation reaction. Examples of the aromatic polymers are shown below.

(1) Polymers mainly containing styrene-type hydrocarbon units such as general-purpose polystyrene, HI (high impact) polystyrene, poly(alpha-methylstyrene), a styrene/acrylonitrile copolymer (AS), a styrene/acrylonitrile/butadiene copolymer (ABS), a styrene/acrylonitrile/ethylene/alpha-olefin/diene copolymer (AES), a styrene/methyl methacrylate copolymer, a styrene/butadiene/styrene block copolymer (SBS), a styrene/isoprene/styrene block copolymer (SIS), hydrogenated SBS(SEBS) and hydrogenated SIS.

(2) Aromatic polycarbonates such as bisphenol A polycarbonate, bisphenol F polycarbonate and bisphenol AD polycarbonate.

(3) Polyphenylene oxide polymers such as polyphenylene oxide, modified polyphenylene oxide such as Noryl, a trade name for a product of General Electric Co. and grafted polyphenylene oxide such as XYRON, a trade name for a product of Asahi Chemical Co.

(4) Aromatic polyesters such as polyethylene terephthalate, polybutylene terephthalate, polyethylene terephthalate isophthalate, polycyclohexylene-dimethylene terephthalate, polyethylene-2,6-naphthalenedicarboxylate, polyphenylene terephthalate, a bisphenol A/terephthalic acid co-polycondensate, and a bisphenol A/terephthalic acid/isophthalic acid co-polycondensate.

The chlorine-containing polymers denote and include, for example, polyvinyl chloride and polyvinylidene chloride. These polymers may be foamed polymers.

These aromatic polymers may be foamed polymers. Preferred among these are general-purpose polystyrene, HI-polystyrene, AS resin, ABS resin, polyethylene terephthalate, polyethylene terephthalate isophthalate, polycyclohexylene-dimethylene terephthalate, polycyclohexylene terephthalate isophthalate, grafted polyphenylene oxide, modified polyphenylene oxide, polycarbonate, polyvinyl chloride, and polyvinylidene chloride.

As required, these aromatic polymers and chlorine-containing polymers are molded into a desired shape such as a bottle, sheet or film, and constitute the aforesaid first and/or second polymer layer.

The polyolefin constituting the first polymer layer may be the same as those exemplified hereinabove with regard to the base polyolefin used in the production of the hot-melt adhesive composition of this invention. It may also be molded into a desired shape such as a bottle, sheet or film, and constitute the first polymer layer.

The first and second polymer layers may be laminated through the adhesive composition of the invention as an interlayer by, for example, a multilayer T-die sheet or multilayer film molding method which comprises feeding the component polymers of the respective layers separately into three extruders, and associating the molten polymers at a single die, or by a tandem method in which the molten polymers are heat-fused outside the die.

The thickness of the adhesive composition of the invention as an intermediate adhesive layer is not critical, and can be varied widely according to the types or thicknesses of the first and second layer polymers. Usually, it may be 1 to 500 microns, preferably 2 to 100 microns.

The thickness of the first polymer layer and the thickness of the second polymer layer are neither critical, and can be varied according to the end use of the final laminate. Generally, each of the first and second polymer layers may have a thickness of 5 microns to 50 mm, preferably 8 microns to 40 mm.

The laminated article obtained by using the adhesive composition of this invention is suitable for use as flexible and rigid packaging materials because of its excellent strength, barrier properties, flavor-retaining properties, and secondary processability (vacuum-moldability, blister-moldability).

When styrene-type hydrocarbon-modified polyolefins obtained by using unsaturated carboxylic acid-grafted polyolefins as polyolefins (a), or blends of the styrene-type hydrocarbon-modified polyolefins and unsaturated carboxylic acid-grafted polyolefins are used in the adhesive layer, a polyamide or an ethylene/vinyl alcohol copolymer can be used as the first or second polymer layer, and this is convenient for some purposes.

The following examples illustrate the present invention in more detail.

EXAMPLES 1 TO 8 AND COMPARATIVE EXAMPLES 1 TO 6

In Example 1, 100 parts by weight of ethylene/propylene copolymer, 10 parts by weight of styrene and 0.2 part by weight of 2,5-dimethyl-2,5-di-tertbutylperoxyhexyne-3 were fed into an extruder having a cylinder diameter of 30 mm. Grafting reaction was performed at a cylinder temperature of 230° C. and a die temperature of 230° C. In other examples, the same procedure as above was taken except that the amounts of the above materials were changed. In this manner, the styrene-grafted ethylene/propylene copolymers as shown in Table 1 were obtained.

Each of the styrene-grafted ethylene/propylene copolymers was melted in one extruder and fed into a die for a three-layer composite T-die sheet. Separately, high-density polyethylene (density 0.955 g/cm$^3$, [$\eta$] 1.5 dl/g) and general-purpose styrene (TOPOREX GP-500-51, a tradename for a product of Mitsui Toatsu Chemicals, Inc.; density 1.05 g/cm$^3$; melt index 0.4 g/10 min. measured at 190° C. under a load of 2.16 kg) were melted by separate extruders, and fed to the above co-extrusion die at a resin temperature of 200° C. to produce a three-layered laminated sheet composed of a layer of the high-density polyethylene having a thickness of 50 microns, a layer of the styrene-grafted ethylene/propylene copolymer (interlayer) having a thickness of 20 microns and a layer of the polystyrene having a thickness of 1 mm.

A test sample having a width of 10 mm was cut off from the three-layered film. It was partly peeled between the polystyrene layer and the styrene-grafted ethylene/propylene copolymer layer, and the two-layered film portion composed of the high-density polyethylene layer and the styrene-grafted ethylene/propylene copolymer was peeled through 180° to the polystyrene layer. Thus, the delamination strength between the polystyrene layer and the styrene-grafted ethylene/propylene copolymer layer was measured. The results are shown in Table 2.

EXAMPLES 9 TO 16 AND COMPARATIVE EXAMPLES 7 TO 12

A three-layered sheet composed of high-density polyethylene, a styrene-grafted ethylene/propylene copolymer and polycarbonate was produced by the same procedure as in Example 1 except that polycarbonate (Panlite ® L-1250, a trademark for a product of Teijin Chemical Co., Ltd.) was used instead of polystyrene, and its resin temperature was adjusted to 280° C.

The sheet could not be peeled between the high-density polyethylene layer and the styrene-grafted ethylene/propylene copolymer layer, and they adhered to each other fully strongly. The delamination strength between the polycarbonate layer and the styrene-grafted ethylene/propylene copolymer layer was measured in the same way as in Example 1. The results are also shown in Table 2.

EXAMPLES 17 TO 24 AND COMPARATIVE EXAMPLES 13 TO 18

A three-layered sheet composed of high-density polyethylene, a styrene-grafted ethylene copolymer and polyvinylidene chloride was produced by the same procedure as in Example 1 except that polyvinylidene chloride (SARAN X05253-16, a tradename for a product of Dow Chemical Co. was used instead of polystyrene and its resin temperature was adjusted to 200° C.

The sheet could not be peeled between the high-density polyethylene layer and the styrene-grafted ethylene copolymer layer, and they adhered to each other fully strongly. The delamination strength between the polyvinylidene chloride layer and the styrene-grafted ethylene/propylene copolymer layer was measured in the same way as in Example 1. The results are shown in Table 2.

TABLE 1

| | Ethylene-propylene copolymer as base polyolefin | | | | Styrene-grafted ethylene/propylene copolymer | | | | | |
|---|---|---|---|---|---|---|---|---|---|---|
| Polymer No. | Ethylene content (mole %) | $[\eta]$ (dl/g) | Degree of crystallinity | Molecular weight distribution $(\overline{M}w/\overline{M}n)$ | Amount of styrene grafted (g/100 g of base polyolefin) | $[\eta]$ (dl/g) | Degree of crystallinity (%) | Molecular weight distribution $(\overline{M}w/\overline{M}n)$ | Melt viscosity (poises) | Content of styrene homopolymer (g/100 g of base polyolefin) |
| 1 | 80 | 1.3 | 15 | 2.7 | 2.0 | 1.4 | 14 | 2.9 | $3 \times 10^5$ | 1.5 |
| 2 | 90 | 1.3 | 45 | 3.0 | 2.0 | 1.4 | 43 | 3.1 | $3 \times 10^5$ | 2.0 |
| 3 | 95 | 1.5 | 60 | 3.5 | 1.8 | 1.5 | 60 | 3.8 | $6 \times 10^5$ | 1.0 |
| 4 | 97 | 1.2 | 70 | 4.2 | 0.8 | 1.3 | 68 | 4.8 | $1 \times 10^5$ | 0.5 |
| 5 | 98 | 1.5 | 73 | 10 | 0.9 | 1.5 | 70 | 12 | $6 \times 10^5$ | 0.5 |
| 6 | 90 | 0.7 | 43 | 3.3 | 1.8 | 0.8 | 40 | 3.5 | $2 \times 10^4$ | 0.7 |
| 7 | 83 | 3.1 | 20 | 3.1 | 1.7 | 3.2 | 18 | 3.8 | $10^6$ | 1.2 |
| 8 | 80 | 1.3 | 20 | 3.0 | 19.0 | 2.1 | 15 | 5.1 | $8 \times 10^5$ | 15 |
| 9 | 55 | 1.6 | 5 | 3.8 | 1.5 | 1.6 | 4 | 4.0 | $6 \times 10^5$ | 1.4 |
| 10 | 97 | 5.2 | 68 | 3.6 | 1.6 | 5.3 | 15 | 4.2 | $10^7$ | 1.0 |
| 11 | 97 | 0.4 | 67 | 3.9 | 1.2 | 0.4 | 17 | 4.1 | 100 | 1.0 |
| 12 | 80 | 1.3 | 20 | 3.0 | 0.05 | 1.3 | 20 | 3.0 | $3 \times 10^4$ | 0.01 |
| 13 | 80 | 1.3 | 20 | 3.0 | 0.1 | 1.3 | 20 | 3.1 | $8 \times 10^4$ | 0.08 |
| 14 | 80 | 1.3 | 20 | 3.0 | 55 | 2.5 | 16 | 6.2 | $6 \times 10^6$ | 82 |

TABLE 2

| Polymer No. | Example (Ex.) or Comparative Example (CEx.) | Delamination strength between the adhesive layer and the polystyrene layer | Example (Ex.) or Comparative Example (CEx.) | Delamination strength between the adhesive layer and the polycarbonate layer | Example (Ex.) or Comparative Example (CEx.) | Delamination strength between the adhesive layer and the polyvinylidene chloride layer |
|---|---|---|---|---|---|---|
| 1 | Ex. 1 | 600 | Ex. 9 | 540 | Ex. 17 | 510 |
| 2 | Ex. 2 | 580 | Ex. 10 | 490 | Ex. 18 | 490 |
| 3 | Ex. 3 | 430 | Ex. 11 | 400 | Ex. 19 | 400 |
| 4 | Ex. 4 | 600 | Ex. 12 | 550 | Ex. 20 | 540 |
| 5 | Ex. 5 | 330 | Ex. 13 | 380 | Ex. 21 | 300 |
| 6 | Ex. 6 | 310 | Ex. 14 | 300 | Ex. 22 | 300 |
| 7 | Ex. 7 | 460 | Ex. 15 | 410 | Ex. 23 | 400 |
| 8 | Ex. 8 | 400 | Ex. 16 | 420 | Ex. 24 | 380 |
| 9 | CEx. 1 | 50 | CEx. 7 | 40 | CEx. 13 | 40 |
| 10 | CEx. 2 | Molding impossible | CEx. 8 | Molding impossible | CEx. 14 | Molding impossible |
| 11 | CEx. 3 | 30 (Molding difficult) | CEx. 9 | 30 (Molding difficult) | CEx. 15 | 30 (Molding difficult) |
| 12 | CEx. 4 | 40 | CEx. 10 | 50 | CEx. 16 | 40 |
| 13 | CEx. 5 | 190 | CEx. 11 | 200 | CEx. 17 | 180 |
| 14 | CEx. 6 | 110 (High-density PE layer also partly peeled) | CEx. 12 | 100 (High-density PE layer also partly peeled) | CEx. 18 | 90 (High-density PE layer also partly peeled) |

EXAMPLES 25 TO 45 AND COMPARATIVE

The delamination strengths of the resulting sheets were measured, and the results are shown in Table 4.

TABLE 3

| Polymer No. | Base polyolefin Composition (mole %) | Degree of crystal-linity (%) | $[\eta]$ (dl/g) | Molecular weight distribution | Styrene-grafted polyolefin Amount of styrene grafted (g/100 g of the base polyolefin) | $[\eta]$ (dl/g) | Degree of crystal-linity (%) | Molecular weight distribution (Mw/Mn) | Melt viscosity (poises) | Content of styrene homopolymer (g/100 g of the base polyolefin) |
|---|---|---|---|---|---|---|---|---|---|---|
| 15 | Ethylene(90)/butene-1 (10) copolymer | 17 | 1.7 | 2.5 | 1.9 | 1.5 | 15 | 2.8 | $5 \times 10^5$ | 1.0 |
| 16 | Ethylene(97)/4-methyl-pentene-1(3) copolymer | 72 | 1.2 | 3.6 | 0.6 | 1.2 | 70 | 3.9 | $6 \times 10^4$ | 0.5 |
| 17 | High-pressure polyethylene | 60 | 1.9 | 16 | 2.5 | 1.8 | 58 | 18 | $5 \times 10^5$ | 2.0 |
| 18 | High-pressure ethylene (96)/vinyl acetate (4) copolymer | 45 | 1.2 | 16 | 2.3 | 1.1 | 40 | 16 | $8 \times 10^4$ | 2.0 |
| 19 | Polypropylene | 50 | 2.5 | 4.8 | 0.8 | 1.5 | 45 | 4.0 | $2 \times 10^4$ | 0.5 |
| 20 | Propylene(70)/butene-1(30) copolymer | 25 | 1.4 | 4.8 | 0.9 | 1.3 | 20 | 3.8 | $7 \times 10^3$ | 1.2 |
| 21 | Propylene(65)/ethylene (35) copolymer | 12 | 1.6 | 5.8 | 0.9 | 1.3 | 10 | 3.9 | $6 \times 10^3$ | 1.0 |
| 22 | Polybutene-1 | 65 | 1.9 | 5.0 | 1.0 | 1.6 | 60 | 5.8 | $6 \times 10^5$ | 1.0 |
| 23 | Poly(4-methylpentene-1) | 38 | 1.1 | 3.5 | 2.5 | 0.9 | 36 | 3.8 | $2 \times 10^3$ | 0.8 |

TABLE 4

| Polymer No. | First polymer | Example (Ex.) or Comparative Example (CEx.) | Delamination strength between the adhesive layer and the polystyrene layer (g/cm) | Example (Ex.) or Comparative Example (CEx.) | Delamination strength between the adhesive layer and the polycarbonate layer (g/cm) | Example (Ex.) or Comparative Example (CEx.) | Delamination strength between the adhesive layer and the polyvinylidene chloride layer (g/cm) |
|---|---|---|---|---|---|---|---|
| 15 | High-density polyethylene (a) | Ex. 25 | 410 | Ex. 32 | 390 | Ex. 39 | 380 |
| 16 | High-density polyethylene (a) | 26 | 530 | 33 | 500 | 40 | 500 |
| 19 | Propylene/ethylene random copolymer (b) | 27 | 380 | 34 | 380 | 41 | 360 |
| 20 | Propylene/ethylene random copolymer (b) | 28 | 560 | 35 | 510 | 42 | 500 |
| 21 | Propylene/ethylene random copolymer (b) | 29 | 390 | 36 | 350 | 43 | 410 |
| 22 | Polybutene-1 (c) | 30 | 300 | 37 | 310 | 44 | 320 |
| 23 | 4-Methyl-pentene-1 (98 mole %)/decene-1 (2 mole %) copolymer (d) | 31 (e) | 320 | 38 (e) | 300 | 45 (e) | 300 |
| 17 | High-density polyethylene (a) | CEx. 19 | 110 | CEx. 21 | 120 | CEx. 23 | 120 |
| 18 | High-density polyethylene (a) | 20 | 150 | 22 | 140 | 24 | 170 |

(a) Density 0.955 g/cc, $[\eta]$ 1.5 dl/g;
(b) density 0.91 g/cc, ethylene content 2 mole %, $[\eta]$ 2.5 dl/g;
(c) density 0.91 g/cc, $[\eta]$ 3.0 dl/g;
(d) density 0.84 g/cc, $[\eta]$ 2.5 dl/g;
(e) the temperatures of the styrene-grafted polyolefin and the first polymer being fed to the die were changed to 260° C. respectively.

EXAMPLES 19 TO 24

Styrene-grafted polyolefins (polymers Nos. 15 to 23) having the properties shown in Table 3 were produced by graft-copolymerizing the base polyolefins shown in Table 3 with styrene in the same way as in Example 1.

In each run, a three-layered laminated sheet was produced in the same way as in Example 1, 9 or 17 except that each of the styrene-grafted polyolefins so produced, each of the first polymers shown in Table 4 and a second polymer selected from general-purpose polystyrene (TOPOREX GP-500-51, a tradename for a product of Mitsui Toatsu Chemicals, Inc.), polycarbonate (Panlite® L-1250, a tradename for a product of Teijin Chemical Co., Ltd.) and polyvinylidene chloride (SARAN X05253-16) were co-extruded and laminated.

EXAMPLE 46

A three-layered sheet was produced in the same way as in Example 1 except that a p-methylstyrene-grafted ethylene/propylene copolymer (p-methylstyrene content 1.5 g/100 g of the copolymer; intrinsic viscosity 1.3 dl/g; the base ethylene/propylene copolymer was the same as in Example 1) was used as an intermediate adhesive layer. The delamination strength between the modified ethylene/propylene copolymer, layer and the general-purpose polystyrene layer was found to be 510 g/cm.

Three-layered sheets were also produced in the same way as in Examples 9 and 17, respectively, except that the aforesaid intermediate adhesive layer was used. The delamination strength between the adhesive layer and the polycarbonate layer or the polyvinylidene chloride layer was 510, or 490 g/cm.

EXAMPLE 47

Three-layered sheets were produced in the same way as in Example 1 except that high-impact polystyrene (DENKA STYROL HI-S-2-301, a tradename for a product of Denki Kagaku Kogyo Kabushiki Kaisha; density 1.04 g/cm$^3$, melt index 7.2), grafted polyphenylene oxide (XYRON 300 V a trade name for a product of Asahi Chemical Co.) and polyethylene terephthalate (BELLPET EFG-6 a trade name for a product of Kanebo Ind. Co.) were respectively used as the aromatic resin, and the temperatures of these resins were adjusted to 200°, 320° and 270° C., respectively.

The delamination strengths between the adhesive layer and the aromatic resin layer in these sheets were found to be 510, 800, and 750 g/cm, respectively.

EXAMPLE 48

The same styrene-grafted ethylene/propylene copolymer as used in Example 1 and the same base ethylene/propylene copolymer as used in Example 1 were mixed in a ratio of 50:50 and 10:90, respectively, in an extruder. Using the resulting styrene-grafted ethylene/propylene copolymer compositions as intermediate adhesive layers, two three-layered sheets were produced in the same way as in Example 1.

The delamination strengths between the adhesive layer and the polystyrene layer in these sheets were found to be 520 and 190 g/cm, respectively.

Three-layered sheets were produced in the same way as in Examples 9 and 17, respectively, except that the above styrene-grafted ethylene/propylene copolymer compositions were used.

The delamination strengths between the adhesive layer and the polycarbonate layer in the sheets were found to be 490 and 195 g/cm, respectively, and the delamination strengths between the adhesive layer and the polyvinylidene chloride layer in the sheets were found to be 450 and 200 g/cm, respectively.

What is claimed is:

1. A hot-melt adhesive composition comprising a styrene-type hydrocarbon-modified polyolefin (c) composed of 100 parts by weight of a crystalline polyolefin backbone (a) having a degree of crystallinity of at least 10% and 0.15 to 50 parts by weight of styrene-type hydrocarbon branches (b) bound at intervals along the polyolefin backbone, wherein said styrene-type hydrocarbon-modified polyolefin (c) is obtained by graft-copolymerization of the polyolefin (a) with the styrene-type hydrocarbon (b) in the heat-molten state in the presence of a radical initiator whereby the content of homopolymer of the styrene-type hydrocarbon is not more than 150 mole%, based on the amount of the styrene-type hydrocarbon bonded to the polyolefin backbone, said modified polyolefin (c) having an intrinsic viscosity ($\eta$) of 0.5 to 5 dl/g, a degree of crystallinity of at least 10% and a weight average molecular weight $\overline{M}w$/number average molecular weight $\overline{M}n$ ratio of from 1 to 15, and wherein said crystalline polyolefin backbone is an ethylene copolymer selected from the group consisting of ethylene/alpha-olefin copolymers and ethylene/vinyl monomer copolymers.

2. The composition of claim 1 wherein the polyolefin (a) has a degree of crystallinity of at least 15%.

3. The composition of claim 1 wherein the polyolefin (a) has an intrinsic viscosity, measured at 135° C. in decalin, of 0.5 to 5 dl/g.

4. The composition of claim 1 wherein the polyolefin (a) has a density of 0.83 to 0.98 g/cm$^3$.

5. The composition of claim 1 wherein the weight average molecular weight $\overline{M}w$/number average molecular weight $\overline{M}n$ ratio of the polyolefin (a) is from 1 to 12.

6. The composition of claim 1 wherein the amount of the styrene-type hydrocarbon (b) bound by graft copolymerization is 0.2 to 5 parts by weight per 100 parts by weight of the polyolefin (a).

7. The composition of claim 1 wherein the styrene-type hydrocarbon is styrene, m-methylstyrene or p-methylstyrene.

8. The composition of claim 1 wherein the modified polyolefin (c) has an intrinsic viscosity of 0.7 to 4 dl/g.

9. The composition of claim 1 wherein the modified polyolefin (c) has a degree of crystallinity of at least 15%.

10. The composition of claim 1 wherein the modified polyolefin (c) has a $\overline{M}w/\overline{M}n$ ratio of from 1 to 12.

11. The composition of claim 1 wherein the modified polyolefin (c) has a density of 0.83 to 0.98 g/cm$^3$.

12. The composition of claim 1 wherein the modified polyolefin (c) has a melt viscosity of from 10 to $5 \times 10^6$ poises.

13. The composition of claim 1 comprising a styrene-type carbon-modified polyolefin (c) composed of 100 parts by weight of a crystalline polyolefin (a) having a degree of crystallinity of at least 15%, an intrinsic viscosity, measured at 135° C. in decalin, of 0.5 to 5 dl/g, a density of 0.83 to 0.98 g/cm$^3$ and a weight average molecular weight $\overline{M}w$/number average molecular weight $\overline{M}n$ ratio of from 1 to 12, and wherein the polyolefin is selected from the group consisting of, ethylene/alpha-olefin copolymers having an ethylene content of at least 75 mole%, and ethylene/vinyl monomer copolymers having a total vinyl monomer content of not more than 15 mole%; and 0.2 to 5 parts by weight of (b) styrene, m-methylstyrene or p-methylstyrene graft-copolymerized onto the polyolefin (a), said modified polyolefin (c) having an intrinsic viscosity of 0.7 to 4 dl/g, a degree of crystallinity of at least 15%, a $\overline{M}w/\overline{M}n$ ratio of from 1 to 12, a density of 0.83 to 0.98 g/cm$^3$ and a melt viscosity of from 10 to $5 \times 10^6$ poises.

* * * * *